Nov. 15, 1938.　　　P. M. LINCOLN　　　2,136,364
METERING DEVICE
Filed April 27, 1936　　2 Sheets-Sheet 1
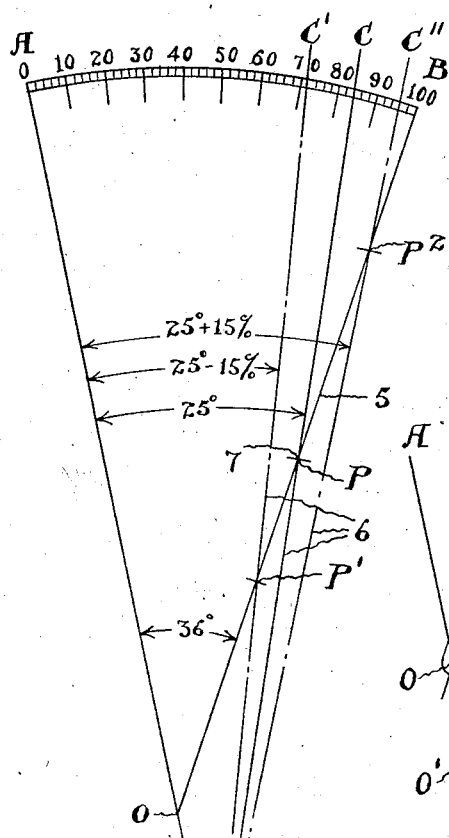
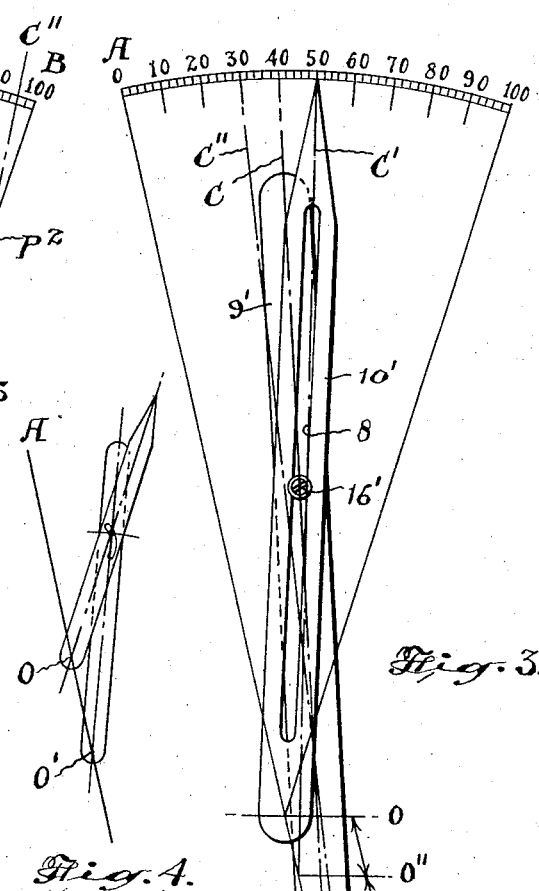
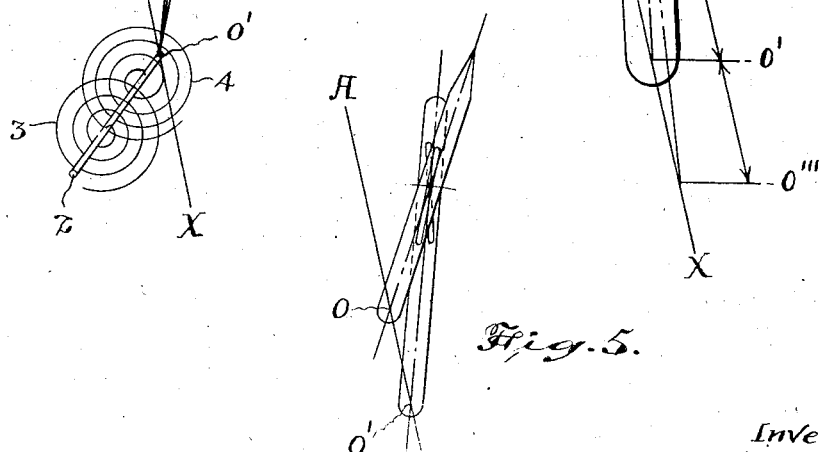
Inventor.
Paul M. Lincoln.

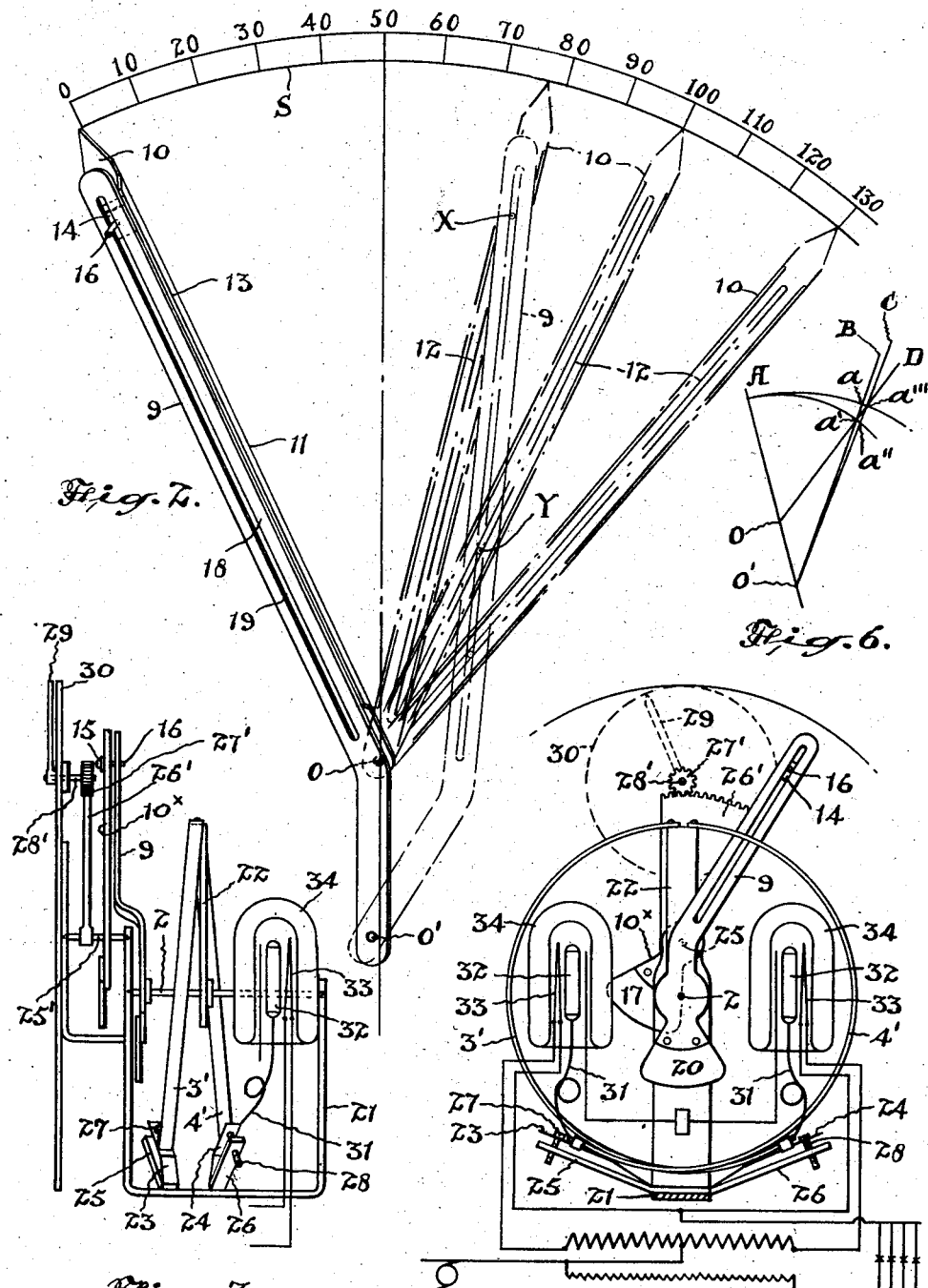

Patented Nov. 15, 1938

2,136,364

UNITED STATES PATENT OFFICE 2,136,364

METERING DEVICE

Paul M. Lincoln, Ithaca, N. Y.

Application April 27, 1936, Serial No. 76,608

7 Claims. (Cl. 116—129)

This invention relates to improved means for adjusting the angular movement of the pointer of a metering device whereby extremely close harmony may be obtained between the pointer, the operating elements and the scale associated therewith.

The invention comprises means associated with the elements actuated by a force expended by the element being measured, whereby the relation of the pointer to the scale may be adjusted to a zero position and may be effectively altered in true proportion to a predetermined value of the actuating force, so that the movement of the pointer will correspond accurately to the deflection of the pointer driving mechanism throughout the entire range of movement of such driving mechanism, there being a variable connection between the driving and driven elements which may be altered to effect the adjustment of the pointer in relation to the printed scale.

In the accompanying drawings,

Figure 1 is a diagram illustrating the principle of the present invention.

Figure 2 is a part diagrammatic and part perspective view illustrating a preferred form of driving and driven members for carrying the invention into effect showing the relative position of said members in several different positions in relation to the scale.

Figure 3 is a diagrammatic part structural view illustrating a modified form of means for carrying the invention into effect.

Figure 4 is a part diagrammatic and part structural view on a smaller scale than the preceding views illustrating a modification of the compensating pin and slot connection between the driving and driven members.

Figure 5 is a view similar to Figure 4 illustrating a still further modification of pin and slot connection.

Figure 6 is a diagram illustrating the principle of the forms of the invention illustrated in Figures 4 and 5.

Figure 7 is a side elevational view of a thermal electric meter structure to which this invention is applied.

Figure 8 is a rear elevational view of the structure illustrated in Figure 7 having a diagrammatic illustration of the set up of the thermal elements of the meter.

In measuring devices of the type in which a pointer co-operates with a printed scale considerable difficulty has been experienced in having the pointer give a true indication upon the scale, over the full range of operation, of the value of the force which actuates the pointer and the present invention has been devised to overcome this difficulty in a very simple manner.

The invention is particularly applicable to thermal demand meters, and it is herein described in connection with such a device in which a shaft is operated by forces exerted by a pair of opposing spirals which may be of the bimetallic form or may be of the "Bourdon" tube type, and which are actuated through the influence of heaters, energized by the flow of current to be measured, in such a manner that rotation of the shaft is proportional to the temperature difference of the heaters actuating the opposing spirals, which temperature difference is accurate in respect to the watts applied.

The angular movement of the shaft in relation to a given temperature difference created by the current flow is variable, on account of the variable characteristics of the "spirals" used, and it is obviously difficult to manufacture such spirals particularly as to thickness, width and length, as well as the actual qualities of the metal used, so that these "spiral" elements will be uniform in all meters. It will also be understood that it is impractical to calibrate each individual instrument and make a scale to suit.

It is, therefore, highly desirable that reliable means be provided which will permit the adjustment of the meters to a standard printed scale, so that a true indication will be given at all points on the scale.

Various methods of adjustment have been proposed, as, for instance, the method proposed in U. S. Patent No. 1,417,695, dated May 30, 1922, but it has been found that these do not give accurate results, particularly when the angular movement of the meter shaft is of the order of 70 degrees, which angularity of movement is common in thermal demand meters which are in extensive use.

Two salient objections found in devices of this class previously used, are first, that the force used to restore the indicator toward zero is not strictly proportional to the deflection at all points of the scale, i. e., where a spring pull is effective through a lever arm, the restoring force is proportional to the sine of the angle of deflection of the changing position of the lever arm. The departure from true proportionality between deflection and restoring force (assuming a constant spring pull) is proportional to one minus the cosine of the angle of deflection, and it will be readily seen that when the deflection approaches anything of the order of 70° angular movement, the departure of true proportionality between restoring force and deflection is very considerable and necessarily causes a distortion error at some point on the scale.

The second objection is that the opposition of the restoring force to the operating force reduces the amount of torque available for moving the idle pointer in a maximum demand meter.

It will be readily appreciated that there is a very considerable difference between the maximum and minimum deflection of the operating mechanism of meters, and, when built in regular factory production, it is found that deflection values vary in the order of from 20% to 30% due to normal variations of dimensions and to variations inherent in the materials particularly in respect to the coefficients of expansion and resilience.

The first objection mentioned above may be substantially obviated by providing a device in which the maximum angular displacement of the indicating finger is considerably less than the 70° angle which obtains in most of the present used instruments, the preferred angle being approximately 36°.

The present invention proposes overcoming the second objection, as above mentioned, by a further reduction of the angular deflection of the meter indicator parts, preferably to an angle of 25° plus or minus 15% and to accomplish this result it is proposed to mount the meter pointer on a center spaced from the center of the driving or torque operated members, the pointer being driven through a pin slidably engaging a slotted arm.

Referring to the diagram shown in Figure 1, OA represents the center line of the pointer in its zero position, OB represents the center line of the indicating pointer at its maximum angle of deflection, the angle AOB being restricted to 36° or less with O representing the axis of movement of the pointer. O'C represents the center line of the arm which forms the means of operating the pointer and which intersects the line OB at P or at variable points as indicated by P¹ and P², the arm being pivoted on the point O' which is located on the zero line AX and spaced a suitable distance from the axis O of the pointer.

The driving arm O'C is mounted on a shaft 2 which is operated by suitable opposed spiral elements 3, 4 which may be bi-metallic members or "Bourdon" tubes actuated by suitable heaters. The average angular deflection of the driving arm O'C is the angle AO'C, about 25°, but variations in structural dimensions and coefficient values of the spirals and heaters may cause a variation in deflection as represented by the angles AO'C' to AO'C".

At the point of intersection of the line O'C with the line OB, the pointer 5 and driving arm 6 (as shown in Figure 3) are connected by a pin 7, which is slidably adjustable in the arm 6 and slidably engages a slot 8 in the pointer 5. The pin 7 may be adjusted on instruments whose actuating elements have differing coefficients, so that the pointers will indicate the same value on the scale under equal deflecting forces applied to the actuating elements 3, 4.

In Figure 2 of the drawings, I show an illustration of a preferred form of driving arm 9 and pointer 10. The pointer 10 is pivoted at O and indicates on a scale S. The straight portion 11 of this pointer member is preferably formed with a longitudinal slot 12 centrally located therein, and the edges 13 are flanged to form a channel shaped structure in which a block 14 is slidably arranged. A screw 15, threaded in the block, extends through the slot 12 and the extension thereof engages the pointer arm on the side opposite the block and serves to clamp the block in adjusted positions. The end 16 of the screw projects from the block in the form of a pin.

The lower end of the pointer is shown flared and provided with a weight 17 to counter-balance the upper end. The driving arm 9 is pivoted at O' below the point O and it is offset laterally, so that its longitudinally slotted portion 18 overlies the pointer 10 with the pin 16 of the pointer extending through the slot 19, when the pointer is aligned with the zero position on the scale. The lower end of the arm 9 is provided with a weight 20 to counterbalance the upper end as shown in Figure 8.

In order to adjust a meter constructed as shown in Figure 2, it is placed under a predetermined load which causes the driving arm 9 to swing away from the zero position and as it does so, the pin 16 here shown carried by the pointer 10 sliding freely in the slot 19, swings the pointer 10 on its pivot over the scale S. If the pointer does not indicate properly in accordance with the known load, the person testing the instrument loosens the screw 15 and slides it and the block 14 carrying the same in the parallel flanged pointer until the pointer is swung to register with the proper index line on the scale. This adjustment is clearly indicated by the dotted positions of the pointer as shown in Figure 2.

It will be readily understood that a very wide range of adjustment may be made in the shifting of the pin 16 throughout the length of the slot in the pointer. If for instance the pin is arranged at the point $x$, the pointer will read approximately 70/80 on the scale for the given deflection of the arm 9 under a known load, but if it is known that the pointer should indicate 100 on the scale, then the pin will be adjusted to the point $y$ with the pointer accurately indicating 100.

It should be pointed out that once the pin has been adjusted to obtain the proper scale reading for a given load on the meter, the proportionality of angular deflections between the driving arm 9 and pointer 10 remains fixed throughout the entire scale, provided the angular deflection of the arm 9 is within reasonable limits.

Figure 3 illustrates another, though not as simple, means of adjustment of proportional angular deflection. The pin 16' will be fixed in either the driving or driven arm and slides in a slot in the other, and the axis O' upon which the driving arm 9' rotates may be shifted in any suitable manner up or down as indicated by O" or O"', such axis being retained on the zero line AX. For example, if the angular motion of the driving arm 9' for a 50% load is AO'C, the location of the axis of said arm at O' will cause the 50% deflection of the pointer 10'; if, however, the angular motion of the driving arm is AO"C' the axis shifted to O" will obtain the same deflection of the pointer, or if the angular motion is AO'''C" the axis shifted to O''' will again obtain the same deflection of the pointer.

In my device, it will be observed that exact proportionality exists only at zero position on the scale, but the departure from exact proportionality is small so long as the angular movements are small, and if the angular movement of the pointer is retained at approximately 36° or less, the departure from true proportionality is negligible.

In Figures 4 and 5, I show a means for eliminating the small error in proportionality which appears to exist in the device as illustrated in Figure 3. The principle of the compensating feature illustrated in Figures 4 and 5 is illustrated in the diagram shown in Figure 6, and referring to this figure, A represents zero on the scale. The axis of the pointer is O, and the axis of the driving arm is O'. Assume that OD represents the maximum angular deflection of the pointer from OA. If the pin connecting the pointer and driving arm is rigid on the driving arm, the maximum angular deflection will cause the pin to move in the slot in the pointer from $a'$ to $a'''$, and if the pin is rigid with the pointer, it will travel in the slot in the driving arm from $a$ to $a''$.

By curving or diagonally arranging the slots in these arms in relation to the line AO, the sliding motion may be made to influence the relative angular movements of the driving arm and pointer. The slots should be the same shape in both arms, so that they will coincide when the arms are in the zero position and the pin may be adjusted without altering the positions of the arms. The curvature or angularity of these slots may be geometrically determined.

In Figures 7 and 8, I show part elevational and part diagrammatic views of a practical application of my invention. A frame structure 21 has the shaft 2 mounted therein, and on this shaft is secured an arm 22 which is secured at its free end to the elements 3'4' which are illustrated as "Bourdon" tubes. The lower ends of these tubes are secured to spring arms 23 and 24 respectively which are mounted over rigid arms 25 and 26 respectively, and the ends of said spring arms are adjustable through the medium of screws 27 and 28 extending through the spring arms and threaded in the rigid arms. By manipulation of these screws the "Bourdon" tubes may be adjusted to rotate the shaft 2, so that the "pointer" operated thereby may be adjusted to register accurately with the zero mark on the scale.

The driving arm 9 is secured on the shaft 2, which is the axis O', and in addition to the lateral offset described, it is offset in the direction of the axis of the shaft to extend over part of the frame 21. A spindle 25' is journalled in the frame in offset relation above the shaft 2 and is the pointer axis O, and on this is mounted an arm 10× which is grooved and slotted in a manner similar to the pointer 10 described, there being slidably mounted therein a block 14 and screw pin 16 which engages the slot of the driving arm. A toothed quadrant 26' is secured on the spindle 25' and meshes with a pinion 27' mounted on a spindle 28' on which is secured the pointer 29.

The flexing of the "Bourdon" tubes rotates the shaft 2 imparting angular displacement to the driving arm 9 which engages the pin 16, and in a compensating sliding movement similar to that described as between the arm 9 and pointer 10, moves the arm 10×. This movement turns the spindle 25' and the quadrant thereon, resulting in a rotative movement being imparted to the pointer carried thereby which indicates on a circular scale 30.

The "Bourdon" tubes are shown diagrammatically connected by flexible capillary tubes 31 which are connected with fluid reservoirs 32 arranged in close relation to heaters 33 within vacuum tubes 34, the heaters being coupled to the power circuit in the usual manner of heaters in meters of the thermal type.

It will of course be understood that the structural representations shown herein may be altered considerably from any of the forms shown and described without departing from the spirit of the invention which is to devise a meter wherein substantially true proportionality exists between the power being measured and the meter reading.

What I claim as my invention is:—

1. In an indicating mechanism for meters having a standard graduated scale, a pointer co-operating with the scale and a driving member for the pointer; means for controlling the ratio of drive between said driving member and pointer including a single variable drive connection only between the said driving member and pointer, and means whereby said driving member is adjustable independent of angular adjustment of the driving member and pointer only when the pointer is at the zero scale position to control the relationship between the pointer and scale beyond the zero scale position.

2. In an indicating mechanism for meters having a standard graduated scale, a pointer member co-operating with the scale and a driving member for the pointer member; means for controlling the ratio of drive between said driving member and pointer member including a single adjustable compensating drive connection only between said driving member and pointer member comprising a pin and slot, and means for rendering said pin and slot connection adjustable independent of angular adjustment of the pointer member and driving member only when the pointer member is at the zero scale position to determine the relationship of the pointer member to the higher scale positions.

3. Means as claimed in claim 2 in which said pointer and driving member are pivotally mounted in a common plane which plane extends through the zero mark of the scale, the axis of said driving member being adjustable along said plane to effect the said adjustment, the pin being secured to one of said members and the slot being in the other member and so positioned that it is parallel with said plane in the zero position only of the pointer.

4. In an indicating mechanism having a standard graduated scale, a pointer pivotally mounted to co-operate with said scale and a driving member pivotally mounted on an axis spaced from the pointer axis; adjustable compensating drive means between said pointer and driving member including guide surfaces on said pointer and driving member extending in a common direction in register when the pointer is at the zero scale position and a driving connection adjustable along both of said guide surfaces simultaneously independent of angular adjustment of the pointer and driving member only when the pointer is at the said zero scale position to control the relation of the pointer to the scale beyond the zero scale position while maintaining the proper zero adjustment, and means for preserving the adjustment of said driving connection relative to one of said guide surfaces.

5. In a meter, the combination with a driving element and a graduated scale, of a pointer member co-operating with said scale and having a slot therein, an arm operatively connected with said driving element and having a slot of a shape identical with that of the pointer slot and accurately registering therewith from end to end only when the pointer is at zero scale position, and a driving pin connection extending through said respective slots and adjustable longitudinally thereof to control the relation of the pointer to the higher scale readings while maintaining the required zero relation of the pointer and scale.

6. In an indicating mechanism having a standard graduated scale, a pointer and a driving member for the pointer; the pointer and driving member being mounted on spaced axes disposed in and parallel to a plane intersecting the scale substantially midway between the zero and maximum scale positions, adjustable compensating drive means between said pointer and driving member including a guide surface on said pointer extending parallel to a plane extending through the axis of the pointer and the zero mark on the scale when the pointer is in the zero scale position, a driving connection slidably engaging said guide surface, and means providing for adjustment of said driving connection on the driving member in a plane parallel to the said slot in the pointer to vary the relationship of the pointer to the higher scale positions while maintaining the zero adjustment.

7. In a meter as claimed in claim 5 in which the respective slots in the driving element and pointer are curved and/or diagonally disposed each in a manner identical with the other to intersect a line connecting the zero marking of the scale and the axis of the pointer only when the pointer is in the zero position, the slots of the respective members being positioned to accurately register the one with the other from end to end when the pointer is at the zero position only, the pin co-operating with the slots being adjustable longitudinally of the registering slots and adapted to be adjustably locked in one of said slots.

PAUL M. LINCOLN.